United States Patent Office 3,340,570
Patented Sept. 12, 1967

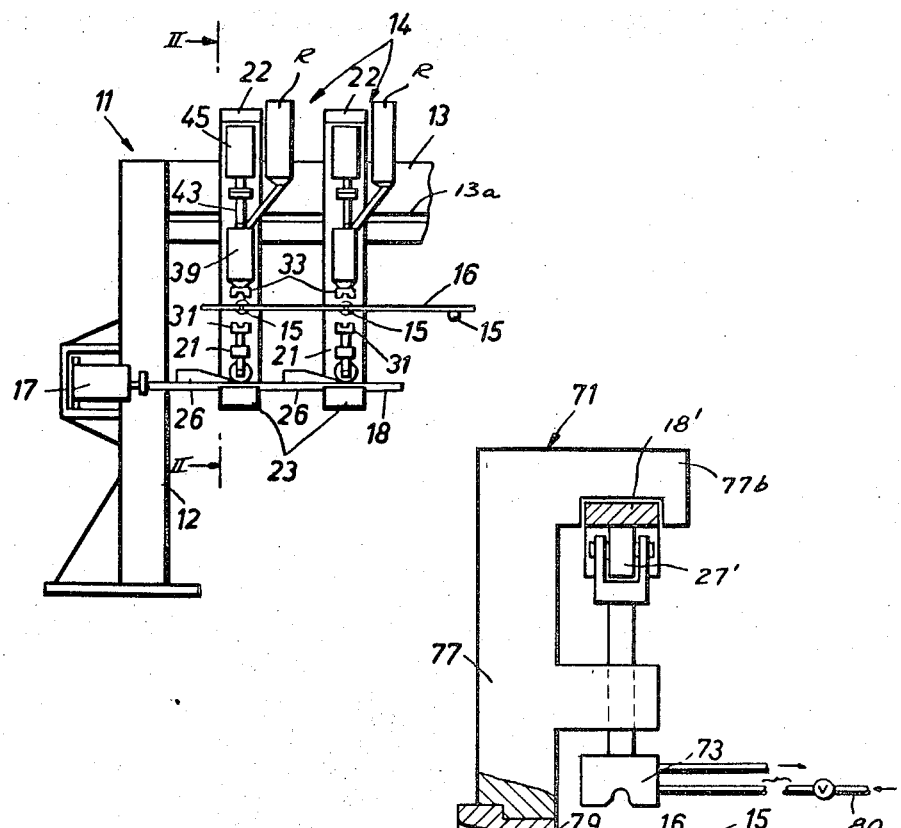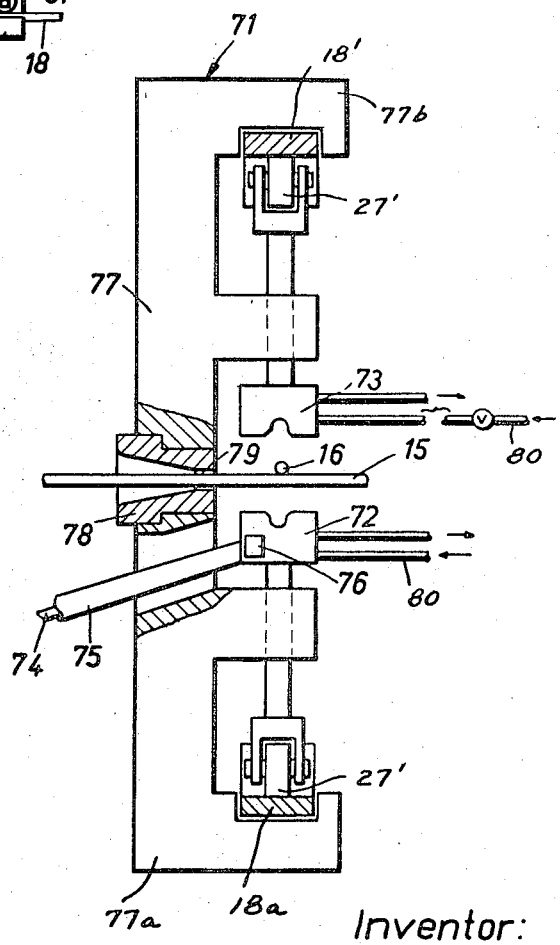

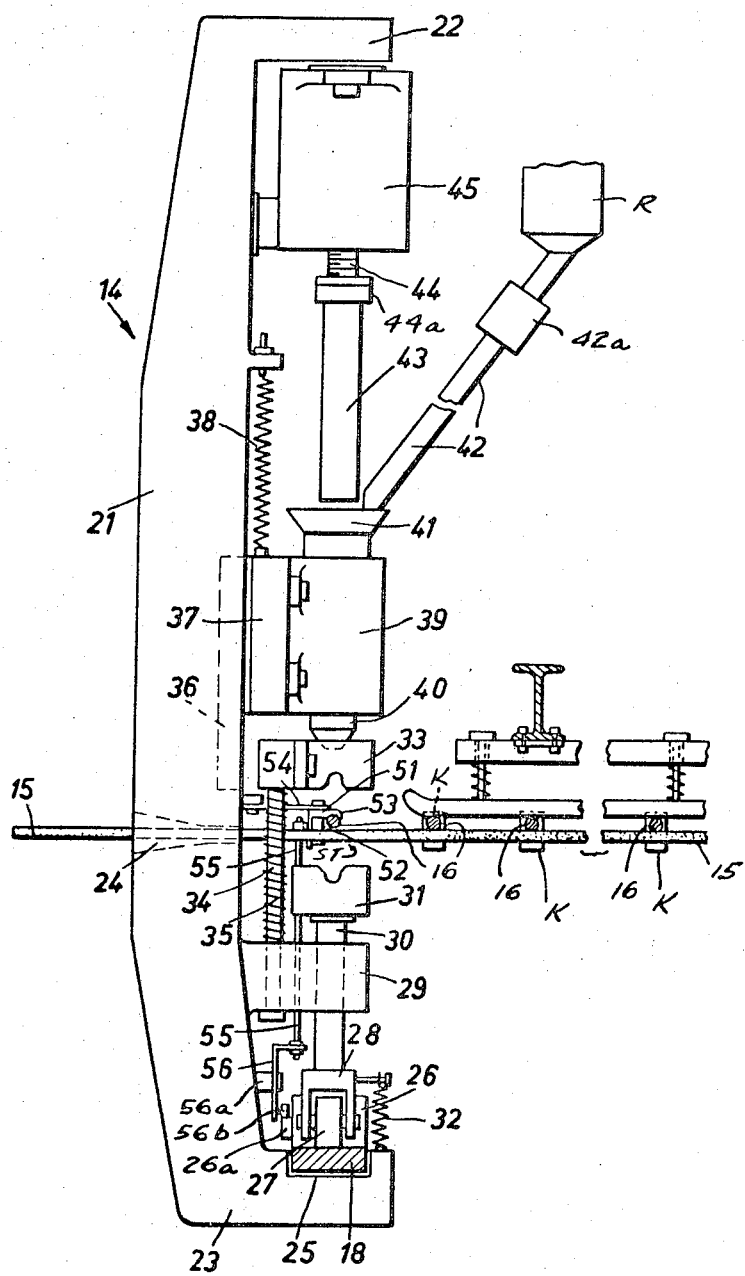

3,340,570
MACHINE FOR THE PRODUCTION OF STRUCTURAL STEEL MATS OR THE LIKE
Willy Korf, Baden-Baden, Germany, assignor to Ferrotest G.m.b.H., Basel, Switzerland
Filed Feb. 4, 1965, Ser. No. 430,288
7 Claims. (Cl. 18—5)

ABSTRACT OF THE DISCLOSURE

A machine for coupling longitudinal rods of a concrete reinforcing mat to transverse rods by means of cruciform jackets applied around the intersections between longitudinal and transverse rods. It comprises pairs of mold sections which are movable toward and away from each other to define mold cavities each receiving one of a row of intersections, and means for admitting hardenable plastic material into such mold cavities.

The present invention relates to a machine for the production of structural steel mats or the like. More particularly, the invention relates to a machine for the production of metallic mats whose rods or wires are joined to each other by plastic jackets of the type disclosed in my copending application Ser. No. 263,823, filed on Mar. 8, 1963, now Patent No. 3,252,263.

My application Ser. No. 263,823 discloses a concrete reinforcing network or mat comprising a plurality of longitudinally and transversely extending metallic rods which intersect each other at a plurality of spaced points, and cruciform jackets of plastic material which bond the longitudinal and transverse rods to each other at some or all points of intersection.

It is an important object of the present invention to provide a very simple, compact and comparatively inexpensive machine which is capable of producing at least one row of plastic jackets in a simultaneous operation, which can produce such plastic jackets within very short intervals of time, wherein such plastic jackets are of identical construction and of identical strength characteristics, and which can be readily and rapidly converted for the production of differently dimensioned mats and/or of mats which consist of differently dimensioned rods.

Another object of the invention is to provide a machine of the just outlined characteristics wherein one or more full batteries of molds may be operated in a single step, wherein each longitudinal and each transverse rod is properly guided, supported and clamped in the course of a jacket-forming operation, and which can produce plastic jackets by injection molding or by an extrusion process.

A further object of this invention to provide a novel clamping or retaining mechanism which is capable of automatically retaining all such rods which are to be connected with each other and which insures that such rods are held against movement with reference to each other until after the freshly formed jackets harden to be self-supporting and to withstand stresses that arise when the rods are adjusted preparatory to the formation of one or more additional rows of jackets.

An additional object of my invention is to provide a novel system of carriers which support the mold sections in a machine of the above outlined characteristics.

A concomitant object of the invention is to provide a novel jacket-forming unit which can be utilized in my machine.

Still another object of the invention is to provide a machine for the production of structural steel mats or the like which can be used for the production of mats from round, ribbed or otherwise profiled stock.

A further object of the invention is to provide a machine which can produce mats of the type wherein the longitudinal rods are normal or otherwise inclined with reference to the transverse rods, wherein the distance between the adjoining longitudinal and/or transverse rods may be changed at the will of the operators, and wherein the number of joints between longitudinal and transverse rods may be selected at will.

Another object of the invention is to provide a machine which can produce structural steel mats or the like by joining longitudinal rods of a first metallic material with transverse rods of a second metallic material which may but need not be weldable to the first material.

An additional object of the invention is to provide a machine of the above outlined characteristics wherein the individual jacket-forming units are constructed and mounted in such a way that stresses transmitted to or produced in one such unit need not be transmitted to the other units.

Briefly stated, one feature of my invention resides in the provision of a machine for forming cruciform plastic jackets around the intersections between longitudinal and transverse rods of structural steel mats or the like. The machine comprises means for guiding and supporting a series of longitudinal rods in a common plane so that at least one transverse rod may be located in a position in which it intersects such longitudinal rods at points which are arranged in a row, a plurality of jacket-forming units each comprising a pair of normally spaced mold sections located at the opposite sides of the common plane for the longitudinal rods and at least one section of each pair being movable toward the other section to define therewith a cruciform mold cavity which receives one of the intersections, actuating means for reciprocating the one mold section of each unit, and means for admitting plastic material into the mold cavities so that such material may form a jacket around the respective point of intersection to provide a connection between the transverse rod and the corresponding longitudinal rod.

The longitudinal rods may be advanced in stepwise fashion and at regular intervals so as to move longitudinally spaced portions into the space between the mold sections of the corresponding units before the one mold section is caused to move toward the other mold section.

The jacket-forming units may be arranged in one or more rows, depending upon whether the machine is to produce one or more rows of jackets in a single operation. The jackets may be formed by an injection molding or by an extrusion process. Certain jacket-forming units may be rendered inactive if the operators decide to produce a mat wherein only some of the intersections are to be surrounded by plastic jackets.

The novel features which are considered as characteristic of the invention are set forth in particular in the appended claims. The improved mat producing machine itself, however, both as to its construction and its mode of operation, together with additional features and advantages thereof, will be best understood upon perusal of the following detailed description of certain specific embodiments with reference to the accompanying drawings, in which:

FIG. 1 is a fragmentary front elevational view of a machine which is constructed in accordance with a first embodiment of my invention;

FIG. 2 is an enlarged vertical section substantially as seen in the direction of arrows from the line II—II of FIG. 1;

FIG. 5 is a vertical section, similar to the one shown in FIG. 2, and illustrates certain component parts of a third machine.

Figure 3:
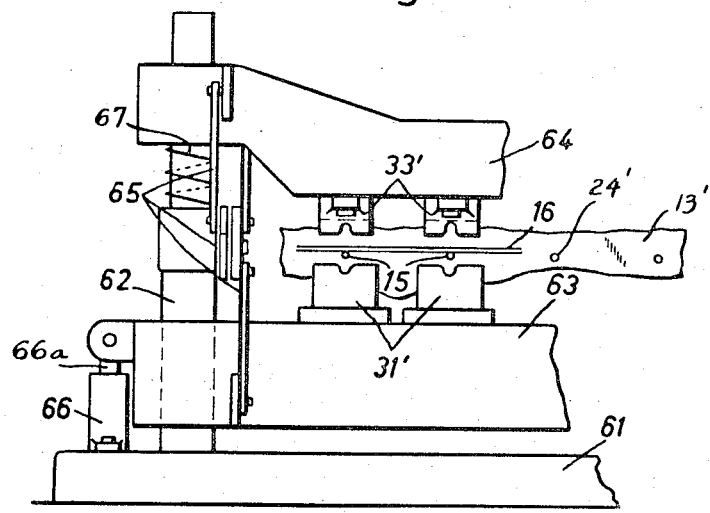
FIG. 3 is a fragmentary front elevational view of a second machine.

Referring to FIGS. 1 and 2, there is shown a portion of a machine which has been actually tested and which is utilized for the production of structural steel mats of the type comprising longitudinal rods or wires 15 and transverse rods or wires 16. Preferably, the rods 16 are normal to the rods 15 and, in accordance with my invention, are secured thereto by synthetic plastic jackets K of the type disclosed in my copending application Ser. No. 263,823. The machine of FIGS. 1 and 2 is arranged to form such jackets in a semiautomatic or in a fully automatic way, depending upon whether the rods 15, 16 are fed by hand or by a suitable feed mechanism.

The machine comprises a main frame 11 including two spaced upright frame members 12 (only one shown) and a horizontal frame member or traverse 13 which extends between the upper ends of the frame members 12. The traverse 13 supports a row of substantially C-shaped carriers 14 which are bolted or otherwise secured thereto at predetermined intervals and each of which supports a separate jacket-forming unit. One of the carriers 14, with the component parts of the corresponding jacket-forming unit, is illustrated in FIG. 2. This carrier comprises a vertical web 21 which is fixedly secured to the traverse 13, an upper flange 22, and a lower flange 23. The distance between the centers of adjoining carriers 14 equals the distance between the adjoining longitudinal rods 15, and each web 21 is provided with an aperture 24 in which the corresponding longitudinal rod 15 is guided and supported for intermittent movement through the associated injection molding station ST. The mechanism for feeding longitudinal rods 15 comprises pairs of intermittently driven feed rolls 15A. The rods 15 are fed in a direction to the right, as the parts appear in FIG. 2, and the rods 16 are inserted in a direction at right angles to the plane of FIG. 2, i.e., in the plane of FIG. 1. The rods 16 may be inserted by hand or by means of a familiar feed mechanism including a magazine 16A provided with a feed chute 16B.

One of the upright frame members 12 supports a hydraulic or pneumatic cylinder 17 which serves to reciprocate a horizontal actuating bar 18. As shown in FIG. 2, the lower flanges 23 of the carriers 14 are formed with ways 25 which guide the actuating bar 18 in its movements in directions parallel with the transverse rods 16. The bar 18 supports a series of wedge-like motion transmitting cams 26 which may displace vertically reciprocable follower rollers 27 mounted in forked brackets 28 provided at the lower ends of vertical pushers 30. The cams 26 may be replaced by eccentrics, hydraulic cylinders, levers, electromagnets or other suitable motion transmitting elements. The upper end of each pusher 30 carries the lower mold section or half mold 31 of the corresponding jacket-forming unit, and these pushers are guided in eyes 29 secured to the webs 21 of the associated carriers 14. The upper end faces of the mold sections 31 are formed with cruciform mold cavities or recesses which are configured in such a way that they shape the lower half of the plastic charge which is admitted following an upward stroke of the respective pusher 30. Return springs 32 operate between the brackets 28 and the corresponding lower flanges 23 to withdraw the mold sections 31 downwardly as soon as the follower rollers 27 are disengaged from the respective cams 26.

The upper mold sections or halves 33 are mounted at the upper ends of vertical bolts 34 which are guided in the respective eyes 29 and are biased by helical expansion springs 35 which tend to move them upwardly and away from the intersection between the corresponding rods 15, 16. Each web 21 is provided with vertical ways 36 for a guide shoe 37 which is biased by a retraction spring 38 so that it tends to move upwardly and away from the injection molding station ST. Each shoe 37 carries an injection cylinder 39 having at its lower end a nozzle 40 which bears against the upper side of the corresponding mold section 33. The orifice of the nozzle 40 communicates with a passage provided in the mold section 33 and serving to deliver a charge of plastic compound into the cruciform mold cavity or recess formed in the underside of the mold section 33. This cavity is bounded by walls which will determine the shape of the upper half of a plastic jacket K to be formed in response to injection of a charge into the composite mold cavity defined by the cooperating mold sections 31, 33. The upper end portion of the cylinder 39 carries a filling funnel 41 which receives granular plastic material through a chute 42 connected to a reservoir R mounted on the traverse 13. While FIG. 1 shows that each jacket-forming unit comprises a separate reservoir R, it is clear that two or more such units may receive plastic material from a common source or that all of the injection cylinders 39 may receive such material from a single reservoir. The chutes 42 deliver plastic material by gravity feed.

Each injection cylinder 39 cooperates with a vertically reciprocable plunger or tamper 43 which is mounted at the lower end of a piston rod 44 analogous to a cam 26 on the horizontal actuating bar 18 and serving to move the associated cylinder 39 downwardly so as to close the corresponding mold 31, 33 by causing the upper mold section 33 to descend toward the lower mold section 31 which latter is being raised by the associated cam. 26. The piston rod 44 extends into a hydraulic actuating cylinder 45 which is fixedly secured to the corresponding carrier 14 at a level above the respective tamper 43. The length of the working stroke of the tamper 43 may determine the quantity of granular plastic compound which is being forced into the cruciform mold cavity defined by the mold sections 31, 33. These mold sections are normally spaced from each other due to the action of springs 32, 35, 38.

As shown in FIG. 2, the chute 42 receives measured quantities of granular plastic material through a suitable feed device or measuring device 42a of familiar construction. Alternatively, and as pointed out above, the tamper 43 may be used as a means for determining the quantity of granular material which is admitted to the associated injection cylinder 39 prior to start of an injection molding operation. This can be achieved by placing the discharge end of the chute 42 in such close proximity to the periphery of the tamper 43 that the latter normally prevents the flow of plastic material into the funnel 41 and allows such material to enter the injection cylinder 39 only at the time when the piston rod 44 is moved to its upper end position. When the piston rod 44 is so retracted, the chute 42 will deliver granular material until the injection cylinder 39 is filled. The tamper 43 will automatically seal the discharge end of the chute 42 as soon as the piston rod 44 begins to perform a working stroke in a sense to force the tamper into the corresponding injection cylinder 39. The reference numeral 44a in FIG. 2 indicates an adjusting device which enables the operator to adjust the stroke of the tamper 43; this is of particular importance when the tamper serves as a means for controlling the outflow of plastic material from the associated chute 42. For example, the adjusting device 44a may comprise a spindle nut which is threaded onto the lower end portion of the piston rod 44.

The machine of FIGS. 1 and 2 further comprises a series of retaining or clamping devices 51 which serve to grip the transverse rods 16 at the time while and preferably also after the mold 31, 33 closes so as to make sure that the rod 16 remains in selected position with reference to the rods 15 until the material of the freshly formed jackets K hardens. Each clamping device 51 comprises a permanent magnet 52 which attracts the transverse rod 16 and keeps it in requisite position during molding and for a period of time immediately following the completion of a molding operation. In addition, each clamping device 51 comprises a claw or jaw 53 which straddles a portion of the rod 16 and urges it against the associated magnet 52 as well as against the longitudinal rods 15. The claws 53 are mounted on elastically deformable arms 54 which are bolted to the corresponding webs 21 and allow the claws to swing up and down so as to be movable into and out of engagement with the transverse rod 16.

It is advisable to provide pull rods 55 which are connected to the clamping devices 51 and are reciprocated by the corresponding cams 26 to move downwardly when the cams 26 lift the lower mold sections 31. As shown in FIG. 2, the pull rod 55 is connected to one arm of a two-armed lever 56 which is rockable about a horizontal pin 56a secured to the web 21. The other arm of the lever 56 carries a follower roller 56b which tracks an auxiliary cam 26a on the cam 26. The face of the cam 26a is configurated in such a way that the pull rod 55 moves downwardly when the mold section 31 is caused to move upwardly whereby the claw 53 clamps the rod 16 against the magnet 52 and against the longitudinal rods 15. In this way, the rods 15, 16 are locked in optimum position at the time the bar 18 and the cylinders 45 lock the mold sections 31, 33 so that such mold sections define cruciform cavities which receive the corresponding points of intersection. The arm 54 normally tends to lift the claw 53 above and away from the rod 16 so that the latter may be released as soon as the follower 56b ceases to track the face of the auxiliary cam 26a. The arrangement is preferably such that the claw 53 is disengaged from the rod 16 immediately or shortly after the mold sections 31, 33 move away from each other.

Additional clamping or retaining devices (such as rails, bars, levers or brackets) may be mounted on the webs 21 at the opposite sides of the mold sections 31, 33 to press against the rod 16 and to urge it downwardly against the longitudinal rods 15 until after the freshly formed jackets K harden sufficiently to be self-supporting and to resist any undesirable deformation at the time the rods 15 are shifted by a step preparatory to the formation of a fresh row of jackets, i.e., preparatory to connection of the next transverse rod 16.

It is normally preferred to assemble the machine of FIGS. 1 and 2 in such a way that all lower mold sections 31 perform working strokes of identical length. The reference plane may extend through the lowermost points of the apertures 24 in which the longitudinal rods 15 are guided for intermittent movement through the molding station.

FIG. 1 shows ways 13a provided in the front face of the traverse 13 and serving to allow for shifting of the carriers 14 toward or away from each other. Thus, the operators may rapidly convert the machine for the production of different types of mats wherein the longitudinal rods 15 may be nearer to or more distant from each other. Also, the carriers 14 may be adjusted and fixed in such positions that the distance between the longitudinal rods 15 varies in accordance with a predetermined pattern, for example, to form mats wherein the longitudinal bars are nearer to each other along two sides but are more distant from each other in the central portion of the mat. Each carrier 14 is mounted on the traverse 13 independently of the other carriers so that stresses absorbed by one carrier in the course of an injection molding operation need not be transmitted to the other carriers. If the machine is to produce mats wherein the longitudinal rods 15 and the transverse rods 16 make an angle other than 90 degrees, the inclination of apertures 24 with reference to the rods 16 is changed accordingly.

The machine of FIGS. 1 and 2 is operated as follows:

The operators introduce a separate longitudinal rod 15 through the aperture 24 of each web 21 so that the forward ends of the rods 15 project a desired distance beyond the molding stations ST. In the next step, the operators place a transverse rod 16 onto the thus obtained row of coplanar rods 15, and the rod 16 is pushed against the magnets 52 which hold it in optimum position for connection to the rods 15. The measuring devices 42a have admitted requisite quantities of granular material into the corresponding injection cylinders 39, and, as soon as the actuating cylinders 17, 45 receive pressure fluid in a sense to move the mold sections 31, 33 toward each other, the tampers 43 penetrate into the injection cylinders 39 to force the plastic charges into the mold cavities and to form a single row of cruciform jackets K. At the same time, the pull rods 55 are caused to descend and to move the jaws 53 into clamping engagement with the transverse rod 16 so that the latter is forcibly retained in requisite position, at least until the molding operation is completed. Once the springs 32, 35 are free to expand and to move the mold sections 31, 33 away from each other, and once the jaws 53 are moved away from the rod 16, the thus obtained portion of the mat is free to be shifted by a step so as to provide room for insertion of a fresh rod 16. The operation is then repeated as often as necessary to form a mat which comprises a requisite number of transverse rods 16. It is clear that the machine of my invention may be combined with a cutting device which automatically severs the rods 15 at regular intervals so that the rods 15 may be of any desired length. For example, such rods may be of a length which exceeds twice or more than twice the length of a finished mat. The cutting device may be operated at regular or irregular intervals to form mats of different length.

It is also clear that the machine of FIGS. 1 and 2 may be modified by providing two or more rows of carriers 14 so that the machine may produce two or more rows of jackets K in a simultaneous operation. This can be achieved by adding one or more traverses 13 each of which supports a separate row of carriers 14 and jacket-forming units. Alternatively, each carrier may be constructed in such a way that it can support two or more separate jacket-forming units. For example, and referring to FIG. 2, the carrier 14 therein shown may constitute one-half of a duplex carrier having a second web which is mirror symmetrical to the web 21 and which carries a second jacket-forming unit. Such duplex carriers may be simplified by utilizing common actuating and biasing elements and by employing a single reservoir R for both upper mold sections.

Figure 4:
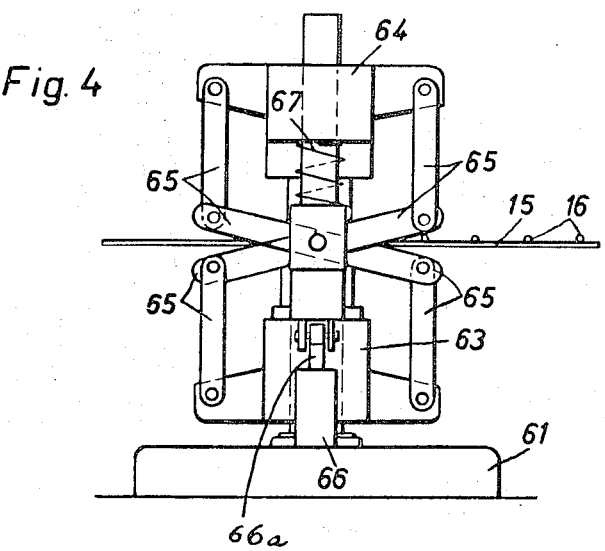
FIG. 4 is an end elevational view of the second machine as seen from the left-hand side of FIG. 3.

FIGS. 3 and 4 illustrate a modified machine which comprises two spaced upright columns or frame members 62 (only one shown) serving to guide a composite carrier structure including two vertically spaced and vertically reciprocable carriers 63, 64. The columns 62 are mounted on a base plate 61 and the two carriers 63, 64 are connected to each other by a linkage 65 shown in FIG. 4 and serving to move the upper and lower mold sections 31', 33' toward or away from each other. These mold sections are respectively mounted on the carriers 64, 63 and each mold section 31' is aligned with a mold section 33'. The linkage 65 is operated by a hydraulic or pneumatic actuating cylinder 66 and is constructed in such a way that the mold sections 31' meet the mold sections 33' in a predetermined horizontal plane when the piston rod 66a performs an upward stroke, this piston rod being coupled to the lower carrier 63. A return spring 67 serves to move the mold sections 31', 33' apart when the pressure in the chamber of the cylinder 66 is relieved. This spring 67 may also balance some of the forces. Similar balancing of forces may be achieved by resorting to adjustable or detachable weights, not shown. It is clear that the other end of the lower carrier 63 may be coupled with the piston rod of a second actuating cylinder, not shown, and/or that such actuating cylinder or cylinders may be operatively connected with the upper carrier 64. All that counts is to provide actuating means for moving the battery of upper mold sections 33' toward and away from the battery of lower mold sections 31', or to move such batteries in a simultaneous operation as actually shown in FIGS. 3 and 4.

The injection cylinders 39 (not shown in FIGS. 3 and 4) may be mounted on the carrier 63 or 64, and the longitudinal rods 15 are guided and supported in apertures 24' provided in one or more fixed traverses 13' one of which is indicated in FIG. 3 behind the carriers 63, 64. It will be readily understood that two or more mold sections 31' or 33' may receive plastic material from a common injection cylinder so that the number of such cylinders need not equal the number of mold sections 31' or 33'. Of course, the supply lines leading from a common injection cylinder to two or more mold sections must be appropriately designed to withstand the temperatures, pressures and other stresses which arise in the course of an injection molding operation. Such supply lines must be heated to maintain compressed plastic material at a constant temperature. The mold sections 31' or 33' may be combined with slide valves or other types of cutoff devices which open and close automatically or by remote control to regulate the admission of plastic material into the mold cavities. The cutoff devices may be mounted in the supply lines or directly in the mold sections, and their function is to admit plastic material as soon as the corresponding mold 31', 33' closes and to close before the corresponding mold sections are moved away from each other.

As mentioned hereinabove, the mechine of FIGS. 3 and 4 can be modified by utilizing a fixedly mounted carrier 63 or 64 and by providing means for moving the other carrier toward and away from the fixed carrier. It is also clear that the machine of FIGS. 1 and 2 can be modified in similar fashion, e.g., by fixedly mounting the bank of mold sections 31 and by providing actuating means for the bank of mold sections 33. Furthermore, I also contemplate resorting to a modification which utilizes a bank of mold sections which are fixedly secured to a common carrier 63 or 64 and a bank of mold sections each of which is secured to a separate carrier or each of which is movable with reference to a second common carrier. If the lower mold sections 31' are movable up and down with reference to the lower carrier 63 (which is then fixed), and if the upper carrier 64 is movable in a manner as shown in FIGS. 3 and 4 to reciprocate the bank of upper mold sections 33' toward and away from the bank of lower mold sections 31', and injection cylinders 39 may be mounted on the upper carrier 64 for movement toward and away from the associated tampers 43. In such modified construction of my machine, the mold sections 33' may be mounted in the same way as shown in FIG. 2, i.e., directly below the nozzles 40 of the injection cylinders. When the upper carrier 64 descends, the mold sections 33' are brought in abutment with the lower mold sections 31'. In the next step, the tampers 43 penetrate into the respective cylinders 39 while the latter engage and are supported by the mold sections 33'. The lower mold sections 31' are raised with reference to the fixed carrier 63 at the time the upper mold sections 33' are caused to descend with the upper carrier 64. The two banks of mold sections 31', 33' meet in a reference plane corresponding substantially to the common horizontal plane of the longitudinal rods 15 shown in FIG. 3.

In all embodiments of my invention, the injection molding units may be replaced by suitable screw-type or other extrusion presses which replace the injection cylinders 39 and tampers 43.

Referring finally to FIG. 5, there is shown a carrier 71 which may be utilized in the machine of FIGS. 1 and 2 as a substitute for one of the carriers 14. This carrier comprises a substantially vertical web 77 which may be adjustably but fixedly secured to the traverse 13 and is provided with a detachable bush 78 having an aperture 79 which guides and supports the longitudinal rod 15. The bush 78 may be threadedly secured in the web 77. The flanges 77a, 77b of the carrier 71 are mirror symmetrical to each other and correspond to the lower flange 23 of the carrier 14 shown in FIG. 2. Each of these flanges guides an actuating bar 18' corresponding to the bar 18 and serving to reciprocate upper and lower follower rollers 27'. Thus, in the carrier 71 of FIG. 5, the two mold sections 72, 73 are reciprocated by identical mirror symmetrical actuating means.

The plastic compound is fed through a supply conduit 74 which is connected to the lower mold section 72, and the latter carries a suitable cutoff device 76, e.g. a slide valve, which regulates the admission of plastic compound into the cruciform cavity defined by the mold sections 72, 73 when the molding unit of FIG. 5 is closed and is ready to form a plastic jacket. The supply conduit 74 is surrounded by a heating device 75 which insures that the temperature of the plastic compound is maintained at an optimum value. The heating device 75 may be a tube which surrounds the supply conduit 74 and is constructed to allow for circulation of a heating fluid. It is clear that the conduit 74 may be heated by an electrical heating device.

The lowermost points of all apertures 79 are located in a common horizontal reference plane which is tangential to the longitudinal rods 15. This is of advantage because the stroke of the lower mold sections 72 need not be adjusted even if the rods 15, 16 are replaced by rods of different diameter or cross-sectional configuration. Thus, the machine may be constructed in such a way that the stroke of the upper mold sections 73 is adjustable but the stroke of the lower mold sections 72 remains unchanged.

The mold sections 72, 73 are hollow and may be cooled by a fluid which is circulated through valved conduits 80 serving to admit such fluid upon completion of an injection molding operation so that the jackets are rapidly cooled. Such cooling devices may also be provided in the machines of FIGS. 1–2 and 3–4 to insure that the intervals between successive molding operations are reduced to a minimum. For the same purpose, I prefer to utilize mold sections consisting of a material having good heat dissipating characteristics to insure very rapid cooling of plastic jackets.

The carrier 71 of FIG. 5 may be replaced by two separate carriers each of which supports one of the mold sections 72, 73. Such separate carriers can be mounted on two elongated carriers or traverses which are fixedly mounted in a stationary frame. Thus, the carriers 63, 64 shown in FIGS. 3 and 4 could be fixed to the machine frame and each thereof could support a bank of vertically reciprocable mold sections 72 or 73. In such modified construction of my machine, each fixed carrier may support two or more parallel rows or banks of mold sections so that the machine can produce two or more rows of jackets in a simultaneous operation.

To my knowledge, the above disclosed machine is the first of its kind because, heretofore, structural steel mats were produced by welding the longitudinal rods to the intersecting transverse rods. The problems which are solved by the present machine are quite different from problems which are encountered in welding metallic rods to each other. Thus, the machine should be capable of competing with welding machines, not only as regards the output, initial cost and maintenance cost, but also as regards the strength and other characteristics of the ultimate product. In my novel machine, the rods 15, 16 remain stationary while the mold sections 31–33, 31'–33' or 72–73 move toward each other to insure proper operating efficiency of the machine. Movements of the mat and/or of the rods 15, 16 in the course of a jacket-forming operation are undesirable because any, even slight displacements of rods 15 with reference to the rods 16 or vice versa might result in the formation of unsatisfactory jackets. The jackets are somewhat soft or pliable immediately after the mold cavities are filled with plastic material, and care should be taken to avoid deformation or tearing of such freshly formed jackets before their material is allowed to set.

If desired, the machine of my invention may be provided with special mechanical or hydraulic locking devices which keep the mold sections of each jacket-forming unit in actual abutment with each other while the plastic-admitting devices introduce charges of plastic material and while the plastic material hardens. Such locking devices may be provided in each of the three illustrated embodiments. In a way, the cams 26 and the cylinders 45 also act as locking devices since they can prevent uncontrolled movements of mold sections 31, 33 away from each other. However, it might become necessary to provide additional locking devices which assist the cams 26 and the cylinders 45 in holding the mold sections 31, 33 against any, even minimal, displacement away from each other when the cylinders 39 admit charges of plastic material. The provision of such separate locking devices is of advantage because the actuating means including the bar 18 and the cylinders 45 of FIG. 1, the cylinder 66 and the linkage 65 of FIG. 3 or the bars 18' of FIG. 5 may be of lightweight construction. This will be readily understood because such actuating devices then merely serve to close the jacket-forming units but need not resist the pressures which arise in the course of an injection molding or extruding operation.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A machine for forming plastic jackets around the intersections between longitudinal and transverse rods of structural steel mats or the like, comprising means for guiding and supporting a series of longitudinal rods in a common plane so that at least one transverse rod may be located in a position in which it intersects such longitudinal rods at points which are arranged in a row; means for feeding transverse rods into positions for attachment to longitudinal rods; a plurality of separate jacket-forming units each comprising a pair of normally spaced mold sections located at the opposite sides of said plane, at least one mold section of each pair being movable toward the other mold section to define therewith a mold cavity which receives one of said points of intersection; actuating means for reciprocating said one mold section of each unit; and means for admitting plastic material into said mold cavities.

2. A machine for forming plastic jackets around the intersections between longitudinal and transverse rods of structural steel mats or the like, comprising means for guiding and supporting a series of longitudinal rods in a common plane so that at least one transverse rod may be located in a position in which it intersects such longitudinal rods at points which are arranged in a row; means for feeding transverse rods into positions for attachment to longitudinal rods; a plurality of separate jacket-forming units each comprising a pair of normally spaced mold sections located at the opposite sides of said plane, at least one mold section of each pair being movable independently of all remaining mold sections toward the other mold section of the same unit to define therewith a mold cavity which receives one of said points of intersection; common actuating means for reciprocating said one mold section of each unit; and means for admitting plastic material into said mold cavities.

3. A machine for forming plastic jackets around the intersections between longitudinal and transverse rods of structural steel mats or the like, comprising means for guiding and supporting a series of longitudinal rods in a common substantially horizontal plane so that at least one transverse rod may be located in a position above said plane in which it intersects such longitudinal rods at points which are arranged in a row; means for feeding transverse rods into positions for attachment to longitudinal rods; a plurality of separate jacket-forming units each comprising a first mold section located above and a second mold section located below said plane, said first and second mold sections being normally spaced from each other and said upper mold sections being movable independently of each other toward the respective lower mold sections to define therewith mold cavities each of which receives one of said points of intersection; carrier means supportingly connected with said mold sections; resilient means for biasing said first mold sections away from said plane; injection cylinders located above and having means for admitting plastic material into said mold cavities, said cylinders being reciprocable up and down to move said first mold sections toward said plane in response to downward movement thereof; and actuating means for moving said cylinders toward said plane.

4. A machine for forming plastic jackets around the intersections between longitudinal and transverse rods of structural steel mats or the like, comprising means for guiding and supporting a series of longitudinal rods in a common substantially horizontal plane so that at least one transverse rod may be located in a position above said plane in which it intersects such longitudinal rods at points which are arranged in a row; means for feeding transverse rods into positions for attachment to longitudinal rods; a plurality of independent jacket-forming units each comprising a first mold section located above and a second mold section located below said plane, said first and second mold sections being normally spaced from each other and said upper mold sections being movable independently of each other toward the respective lower mold sections to define therewith mold cavities each of which receives one of said points of intersection; carrier means supportingly connected with said mold sections; resilient means for biasing the first mold section of each unit away from said plane; separate plastic-admitting means provided on said carrier means for each of said units and each arranged to introduce plastic material into the corresponding mold cavity, each of said plastic admitting means comprising a reciprocable injection cylinder having a nozzle located above the respective first mold section; and actuating means for moving said first mold sections toward said plane prior to admission of plastic material into said mold cavities, said actuating means comprising means for moving said cylinders toward said plane so that the first mold sections are moved toward said plane through the intermediary of said nozzles.

5. A machine for forming plastic jackets around the intersections between longitudinal and transverse rods of structural steel mats or the like, comprising means for guiding and supporting a series of longitudinal rods in a common plane so that at least one transverse rod may be located in a position in which it intersects such longitudinal rods at points which are arranged in a row; means for feeding transverse rods into positions for attachment to longitudinal rods; a plurality of separate jacket-forming units each comprising a pair of normally spaced mold sections located at the opposite sides of said plane, at least one mold section of each pair being movable toward the other mold section to define therewith a mold cavity which receives one of said points of intersection; actuating means for reciprocating said one mold section of each unit; and means for admitting plastic material into said mold cavities, said last named means comprising injection cylinder means, conduit means connecting said cylinder means with one mold section of each unit, and means for heating said conduit means.

6. A machine for forming plastic jackets around the intersections between longitudinal and transverse rods of structural steel mats or the like, comprising means for guiding and supporting a series of longitudinal rods in a common plane so that at least one transverse rod may be located in a position in which it intersects such longitudinal rods at points which are arranged in a row; a plurality of jacket-forming units each comprising a pair of normally spaced mold sections located at the opposite sides of said plane, at least one mold section of each pair being movable toward the other mold section to define therewith a mold cavity which receives one of said points of intersection; actuating means for reciprocating said one mold section of each unit; clamping means for holding the transverse rod against movement with reference to the longitudinal rods when said mold sections define said mold cavities; and means for admitting plastic material into said mold cavities.

7. A machine as set forth in claim 6, wherein said clamping means are operatively connected with said actuating means to engage the transverse rod in response to movement of said one mold section of each unit toward the other mold section.

References Cited
UNITED STATES PATENTS

| | | | |
|---|---|---|---|
| 2,163,177 | 6/1939 | Novotny | 264—275 X |
| 2,206,714 | 7/1940 | Benander | 264—275 |
| 2,500,258 | 3/1950 | Mazzoni | 18—36 |
| 2,744,289 | 5/1956 | Wanders | 18—36 X |
| 2,794,211 | 6/1957 | Brown et al. | 18—5 |
| 2,876,499 | 3/1959 | Schultz | 18—36 X |

WILLIAM J. STEPHENSON, *Primary Examiner.*